April 25, 1961 R. L. KITRELL 2,981,824
WELDING APPARATUS AND DAM
Filed May 7, 1958
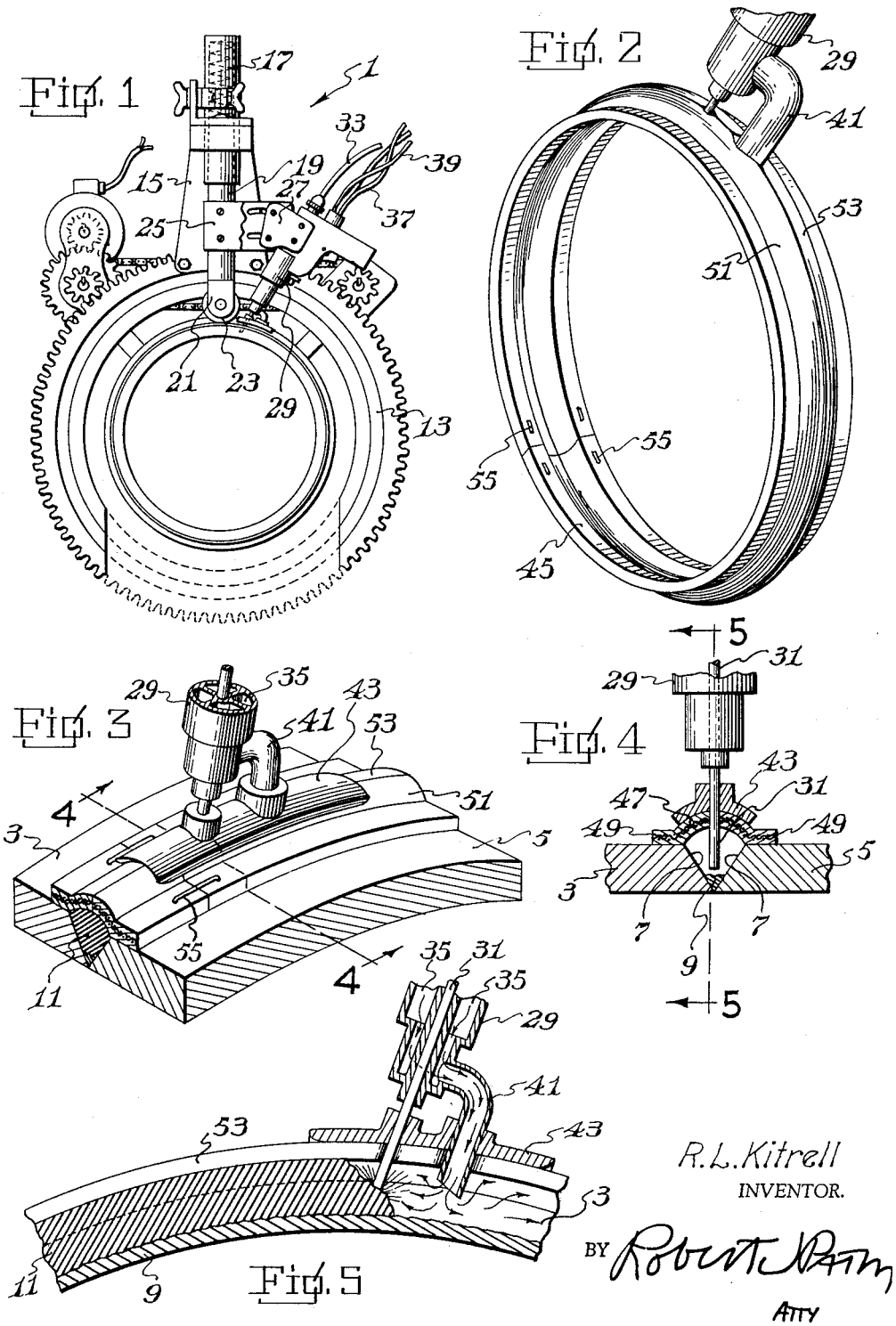
R.L. Kitrell
INVENTOR.
BY Robert J. Pain
ATTY

United States Patent Office 2,981,824
Patented Apr. 25, 1961

2,981,824

WELDING APPARATUS AND DAM

R. L. Kitrell, 5100 E. 17th St., Tulsa, Okla.

Filed May 7, 1958, Ser. No. 733,633

10 Claims. (Cl. 219—125)

The present invention relates to welding apparatus and dams, and more particularly to welding apparatus adapted to form non-horizontal welds in connection with a dam for covering the molten weld to retain the molten material in place in the weld until the melt solidifies, and to such apparatus for use in connection with inert-gas-shielded electric welding, and to the dams themselves.

In the assembly of great lengths of pipe such as pipe lines, it is customary to assemble the pipe line from a plurality of relatively short pipe sections laid end to end. The contiguous ends of each adjacent pair of sections are beveled and butt welded. Since the work cannot be rotated, the welding operation requires welding from literally every angle from straight down to straight overhead.

In the past, it has been customary to reduce the amount of welding that must be done in the ditch of a pipe line by welding together two lengths of pipe while they are still on the surface of the ground, a procedure known in this art as "double-jointing." The double-joint is then lowered into the ditch and welded to that portion of the pipe line which has already been laid. It has been necessary for welders to get down into the ditch to work. Naturally, the ditches are not dug much larger than is necessary, so that the welder has been forced into dangerously close contact with his work. The difficulties and dangers of welding in such confined quarters will be especially clear when it is realized that a large proportion of each weld is overhead or vertical work, with the result that there is a good deal of dripping and spatter.

In addition to the dangers involved, it will also be realized that the loss of so much metal from the weld inevitably leaves a weld which is undesirably weak. Furthermore, the irregularities in the weld introduced by such loss of weld metal set up points of galvanic action after the weld has been buried, and this results in excessive localized corrosion.

In addition to the difficulties inherent in non-horizontal welding, certain other difficulties attend the welding operation in any position. The welding operation in its broadest aspect is a procedure by which metals are temporarily subjected to extremely high temperature and in part attain a molten, extremely fluent condition. This leads to oxidation by contact with air and weld metal contamination with the rapid migration of impurities, so that the finished weld may be weak and adhere poorly to the base. In an effort to purify the weld metal and prevent contact with the air, various fluxes have been proposed which would purify the weld metal and form a protective layer of slag thereon. Unfortunately, however, the presence of a layer of slag on the weld to some extent prevents the forming or molding of the weld to a cross-sectional configuration having the greatest strength characteristics; and also, the slag must later be cleaned or chipped away from the weld.

Hence, recourse has been had to inert-gas-shielded welding, in which a stream of inert gas such as helium or argon or a mixture of both is played about the arc to exclude air and prevent weld metal contamination so that no flux is needed. It is the continuous supply of inert gas adjacent the arc that eliminates the air; and therein lies a weakness of the prior art practice in connection with shielding gas, for the use of a substantial quantity of this gas has heretofore been needed adequately to expel the air from the vicinity of the arc. The inert gas is fairly expensive, and if an atttmpt is made to reduce the quantity used by cutting the flow thereof about the arc, air will infiltrate the weld area to an undesirably high degree. On the other hand, if adequate inert gas is supplied, the cost is proportionately high.

Although many attempts have been made to overcome the foregoing and other difficulties and disadvantages of the prior art in this area, none, as far as is known, was entirely successful when practiced commercially on an industrial scale.

Accordingly, it is an object of the present invention to provide apparatus for welding joints between contiguous members, which is adapted to prevent the loss of molten metal from the weld.

Another object of the present invention is the provision of apparatus for welding joints between contiguous members, in which provision is made for shielding the welding area against air by the use of a minimum quantity of inert gas.

Still another object of the present invention is the provision of apparatus for welding joints between contiguous members in connection with the use of a welding dam, and the provision of a welding dam itself, characterized in that the dam may be positioned in operative relationship to the joint prior to welding.

Finally, it is an object of the present invention to provide apparatus for welding joints between contiguous members and welding dams for use in connection with such or other apparatus, which will be relatively simple and inexpensive to manufacture, easy to adjust and to operate at high speeds, and safe, rugged and durable in use.

Broadly, the present invention solves the problems of the prior art in this field by providing apparatus for welding joints between contiguous members, in which a welding device is mounted on a carriage for movement along the joint to be welded, and a dam is provided to shape and form the weld and retain the weld metal in place until it solidifies. That same dam also serves as a shield beneath which an inert gas is introduced to exclude air by the use of a minimum quantity of inert gas. The dam and the shield are both embodied in an elongated strip positionable over the joint prior to welding and through which both a welding electrode and an inert gas may be introduced.

Other objects, features and advantages of the present invention will become apparent from a consideration of the following description, taken in connection with the accompanying drawing, in which:

Figure 1 is an elevational view endwise of a pipe line and showing the structure of the present invention in operative relationship;

Figure 2 is an enlarged fragmentary perspective view showing a welding dam according to the present invention in operative orientation and showing the relationship thereto of the welding and inert-gas-shielding means but with the shoe removed;

Figure 3 is an enlarged fragmentary perspective view of a portion of the structure shown in Figure 1 adjacent the welding area;

Figure 4 is a cross-sectional view taken on the line 4—4 of Figure 3; and

Figure 5 is a cross-sectional view taken on the line 5—5 of Figure 4 and illustrating the welding operation in progress.

Referring now to the drawing in greater detail, there is shown generally at 1 an apparatus for welding joints between contiguous members, which in the illustrated embodiment are aligned cylindrical pipe sections 3 and 5 having beveled contiguous edges 7 having therebetween the usual stringer bead 9 which aids in the subsequent reception and retention of a weld 11 between edges 7. The apparatus is supported for revolution in either direction about the common axis of pipe sections 3 and 5 by means of the structure illustrated and described in copending application Serial No. 711,599, filed January 28, 1958, this structure being incorporated in the present application by reference so as to avoid useless repetition of the disclosure thereof.

There is thus provided a carriage 13 including a bracket 15 on which is adjustably mounted a cylindrical sleeve 17 within which is disposed for radial reciprocation a shaft 19 spring urged radially inwardly, all as described in the above identified copending application. A yoke 21 is carried by the radially inner end of shaft 19 and carries between its legs a presser member or guide means comprising a roller 23 having an arcuately concave periphery and which is rotatable relative to yoke 21.

A pair of flat parallel plates 25 is secured in unitary assembly with and on opposite sides of shaft 19, plates 25 supporting between them an adjustable bracket 27 by which is carried the cylinder 29 of the welding head or gun. A consumable welding electrode 31 extends longitudinally slidably through the central bore of cylinder 29 and is fed continuously toward the welding area through the usual flexible cable 33 by means of the usual electrode feeding devices (not shown). Spaced about the central bore of cylinder 29 are the usual gas ducts 35 for the provision of an inert shielding gas, these ducts being supplied by the usual gas line 37 adjacent the usual control cable 39.

The inert gas used for shielding may be any of the gases commonly used for this purpose, such as helium, argon, carbon dioxide or other inert gases or mixtures thereof, and may even contain a very small amount of oxygen for special applications and still be "inert" within the meaning of the art and this application.

Ducts 35 communicate at their radially inner ends with a hollow tubular elbow 41 which extends first laterally outwardly from the ducts and then radially inwardly substantially parallel to electrode 31. Mounted on elbow 41 a substantial distance from its free or radially inner end is a shoe 43. Elbow 41 passes through and is secured within an opening through shoe 43, while electrode 31 passes through and is slidably disposed within another opening through shoe 43. Shoe 43 is elongated and adapted to be positioned lengthwise over the joint to be welded, the two openings through the shoe being spaced apart a substantial distance lengthwise of the shoe. Shoe 43 is arcuate about a relatively broad arc having its center on the common axis of the pipe sections as shown in Figure 5 and is also arcuate in the other direction about a much more abruptly curved arc having its center adjacent the radially inner end of electrode 31 as seen in Figure 4. This more abrupt curvature defines on the underside of shoe 43 a groove extending lengthwise of and opening toward the joint, the groove also extending lengthwise of shoe 43.

The dual function of retaining the molten weld metal in its desired shape until it solidifies with an arcuate bead which imparts to the completed weld the greatest strength, and of preventing the influx of air adjacent the weld so as to enable the use of a minimum quantity of inert shielding gas, is performed by a flexible welding dam which is secured prior to welding to the contiguous members to be welded together and is disposed lengthwise of and over the joint to be welded. The dam is in the form of an elongated, resiliently deformable strip 45 having permanently a cross-sectional configuration best seen in Figure 4, which includes an arcuate mid-portion 47 the opposite faces of which are defined by segments of circles of equal radius. The cross-sectional configuration of strip 45 is also characterized by a pair of straight aligned end portions 49 disposed one on each side of mid-portion 47. The cross-sectional configuration of the strip is uniform throughout the length of the strip, so that arcuate mid-portion 47 of the cross-sectional contour of the strip represents a partially cylindrical longitudinally extending central portion of the strip while straight end portions 49 of the cross-sectional contour represent uniplanar edge portions in a straightened position of the strip extending longitudinally of each side of the strip.

The flexible welding dam of the present invention is pre-formed to the desired final weld shape and has a stiffness such that it retains that shape when unsupported. It may be woven or matted fiber glass or asbestos fiber or other flexible heat-resistant material. Since the diameter of the filaments of glass fiber is subject to wide variation, it should be noted that a suitable glass filament diameter is 0.0002 to 0.00025 inch. Pre-forming may be accomplished by sizing or stiffening followed by pressure rolling, as disclosed in the application of the same inventor entitled "Welding Apparatus and Flexible Dam for Use Therewith" and filed under even date herewith, reference to the disclosure of that application being had to avoid the useless repetition of the method and materials disclosed therein.

Strip 45 is comprised of a pair of longitudinally coextensive, separable, abutting dam halves 51 and 53. This construction enables electrode 31 and elbow 41 to travel between halves 51 and 53, spreading them momentarily apart, the halves thereafter promptly returning to abutting relationship thanks to the resiliency of the material of strip 45. Arcuate mid-portion 47 is complementary to and disposed partly within the groove on the underside of shoe 43, as best seen in Figures 3 and 4, and also serves to maintain halves 51 and 53 in abutting relationship except for the holes which are pushed therethrough by electrode 31 and elbow 41.

Thus, the line along which dam halves 51 and 53 meet extends longitudinally of strip 45 and parallel to the side edges thereof in the illustrated embodiment. This line of abutment in the illustrated embodiment is spaced mid-way between those longitudinal side edges of strip 45 and is located at the highest point of arcuate mid-portion 47 as seen in Figures 3 and 4. In any event, the cross-sectional contour of each dam half 51 or 53 will include a portion of arcuate mid-portion 47 and one straight end portion 49 of the cross-sectional contour of strip 45.

Strip 45 is applied to the members to be welded together prior to the welding operation. It may be dispensed from rolled up condition on a spool and wrapped around the aligned contiguous ends of pipe sections or applied to other contiguous members to be welded so as properly to position it over the joint. Strip 45 s secured to those contiguous members so as to prevent displacement during the welding operation. This securement may be effected in a variety of ways. For example, the undersides of straight portions 49 may be coated with a pressure-sensitive adhesive, as disclosed for instance in Example 1 of United States Patent No. 2,484,060, October 11, 1949. In this way, strip 45 can simply be wrapped around the pipe sections or applied to other contiguous members to be welded and will cling to the surfaces adjacent the joint and may be stripped off after welding. Alternatively, the ends of the strip may be clipped or stapled to a suitable support, as seen in Figures 2 and 3 in which staples 55 secure opposite ends of strip 45 together. In this latter case, the friction of the undersides of straight portions 49 against the contiguous members to be welded together is sufficient to hold the strip in operative position without the use of a pressure-sensitive adhesive.

The abutting edges of dam halves 51 and 53 longitudinally centrally of strip 45 may also be detachably and separably sealed together by use of a pressure-sensitive adhesive such as that identified above. In this way, it is assured that there will be no separation of the dam halves prior to passage of electrode 31 or elbow 41 therebetween and that when the dam halves re-engage following the passage of elements 31 and 41 they will do so in sealed relationship. However, the natural resiliency of strip 45, augmented by the tendency of shoe 43 to push the dam halves together is ordinarily quite adequate to assure abutting relationship of halves 51 and 53 on both sides of the welding area, so that the use of a pressure-sensitive adhesive between the dam halves is a refinement as broadly disclosed, rather than an essential feature of the invention.

Accordingly, the operation of the apparatus according to the present invention will be clear, as follows:

With the welding dam in position over the joint to be welded, as described above, sleeve 17 is adjusted relative to bracket 15 as described in the earlier copending application identified above. Roller 23 bears on straight portions 49 of the welding dam, the peripheral groove of this roller receiving arcuate mid-portion 47 of the dam, so that the thrust of shaft 19 is transmitted through roller 23, through straight portions 49 and to the surfaces of pipe sections 3 and 5 marginally of the joint to be welded. In this sense, the guide means comprising roller 23 bears against pipe sections 3 and 5. Cylinder 29 is adjusted by means of manipulation of bracket 27 relative to plates 25 so as properly to position electrode 31 and elbow 41 so that they protrude through strip 45 between halves 51 and 53 and terminate beneath strip 45, with shoe 43 bearing lightly and slidably against the outer surface of arcuate mid-portion 47. It should be noted that the resiliency of halves 51 and 53 enables the penetration therebetween of elements 31 and 41 as seen in Figure 2 without substantial departure of strip 45 from its cross-sectional configuration as seen in Figure 4. Welding may then proceed with the arc struck and the carriage revolving and the electrode continuously advancing into the weld area, entirely about the pipe sections, or from bottom to top successively about each half of the joint as described in the earlier copending application identified above. After completion of the welding operation, the welding dam is stripped away, leaving a strong, homogeneous weld of the desired shape.

It should particularly be noted that the welding apparatus and dam according to the present invention serve not only to shape the weld and retain the weld metal in position until it solidifies, but also enable the use of a minimum quantity of inert shielding gas. This is because the welding dam in advance of the welding area in the direction of welding, which is clockwise as seen in Figure 5, serves as a shield to exclude air, and also because the inert gas is introduced beneath the shield provided by the dam a substantial distance in advance of the electrode in the welding direction. In this way, the inert gas fills the area within the joint beneath the welding dam a substantial distance in advance of the welding area and thereby excludes air from this area. At the same time, the confinement of the inert gas beneath the welding dam assures that a minimum of inert gas be used. Moreover, shoe 43, positioned as it is over and in sliding contact with the welding dam entirely about the points at which electrode 31 and elbow 41 protrude through the welding dam, further improves the seal provided by the dam and to a large extent closes the gaps between halves 51 and 53 and elements 31 and 41 against either the entry of air beneath the dam or the excessive escape of inert gas at those points.

During the actual welding operation, the unitary assembly of shaft 19, yoke 21, the guide means provided by roller 23, cylinder 29 and shoe 43 has movement relative to the carriage only radially of the axis of the pipe sections, and even then only to the extent necessary to accommodate irregularities in the configuration of the pipe sections such as might render weld 11 non-circular. Accordingly, it should be noted also that since these parts are all in unitary assembly, such relative radial movement will not affect the relationship of these parts relative to each other despite irregularities of the contiguous members to be welded, so that a fixed relationship of these parts is maintained relative to each other throughout the welding operation. Of course, the electrode will be gradually consumed, but since it is continuously fed toward the weld a constant electrode orientation is also maintained.

From a consideration of the foregoing, it will be obvious that all of the initially recited objects of the present invention have been achieved.

Although the present invention has been described in connection with preferred embodiments, it is to be understood that modifications and variations may be resorted to without departing from the spirit of this invention, as those skilled in this art will readily understand. Such modifications and variations are considered to be within the purview and scope of the present invention as defined by the appended claims.

What is claimed is:

1. In a welding assembly comprising a carriage and means mounting the carriage for movement along a joint to be welded between contiguous members, the improvement comprising a welding dam covering said joint, the dam being comprised of a pair of longitudinally coextensive, resiliently deformable, separable, edgewise abutting dam halves, a shoe supported by the carriage for movement along the dam and having an undersurface complementary and contiguous to the adjacent dam surface, and a welding electrode supported by the carriage and extending through the shoe and between the dam halves and beneath the dam.

2. The invention of claim 1, and means for introducing an inert gas through the shoe and between the dam halves and beneath the dam.

3. In a welding assembly comprising a carriage and means mounting the carriage for movement along a joint to be welded between contiguous members, the improvement comprising a welding dam covering said joint, the dam being comprised of a pair of longitudinally coextensive, resiliently deformable, separable, edgewise abutting dam halves which together have an arcuate cross-sectional configuration convex away from the joint, a shoe supported by the carriage for movement along the dam and having a concave undersurface defining a groove extending lengthwise of and opening toward the joint and within which a portion of the dam is disposed, and a welding electrode supported by the carriage and extending through the shoe and between the dam halves and beneath the dam.

4. The invention of claim 3, and means for introducing an inert gas through the shoe and between the dam halves and beneath the dam.

5. For use with apparatus for welding joints between contiguous members, a welding dam positionable lengthwise over a joint to be welded between contiguous members, the dam being in the form of an elongated strip having an arcuate cross-sectional contour, the strip being comprised of a pair of longitudinally coextensive, resiliently deformable, separable, edgewise abutting dam halves each having a cross-sectional contour including a portion of said arcuate cross-sectional contour.

6. For use with apparatus for welding joints between contiguous members, a welding dam positionable lengthwise over a joint to be welded between contiguous members, the dam being in the form of an elongated strip having a cross-sectional contour characterized by an arcuate mid-portion and a pair of straight, aligned end portions one on each side of the mid-portion, the strip being comprised of a pair of longitudinally coextensive, resiliently deformable, separable, edgewise abutting dam halves each having a cross-sectional contour including a portion of said arcuate mid-portion and one of said straight end portions.

7. In a welding assembly comprising a carriage and means mounting the carriage for movement along a joint to be welded between contiguous members, the improvement comprising a flexible welding dam covering said joint, a welding electrode supported by the carriage and extending beneath the dam, and means for introducing an inert gas beneath the dam forwardly of the electrode in the welding direction.

8. In a welding assembly comprising a carriage and means mounting the carriage for movement along a joint to be welded between contiguous members, the improvement comprising a welding dam closely covering said joint for contacting and retaining weld metal against the joint, the dam being comprised of a pair of longitudinally coextensive, resiliently deformable, separable, edgewise abutting dam halves which together have an arcuate cross-sectional configuration convex away from the joint, and a welding electrode supported by the carriage and extending between the dam halves and beneath the dam.

9. The invention of claim 8, and means for introducing an inert gas between the dam halves and beneath the dam.

10. The invention of claim 8, the dam halves contacting the contiguous members along opposite sides of said joint.

References Cited in the file of this patent

UNITED STATES PATENTS

| | | |
|---|---|---|
| 1,886,643 | Chapman | Nov. 8, 1932 |
| 2,796,510 | Herbert | June 18, 1957 |
| 2,804,885 | Mott | Sept. 3, 1957 |
| 2,866,078 | Ballentine et al. | Dec. 23, 1958 |